H. H. MOSELEY.
AUTOMOBILE STARTER.
APPLICATION FILED JUNE 14, 1913.
1,092,739.
Patented Apr. 7, 1914.
2 SHEETS—SHEET 1.
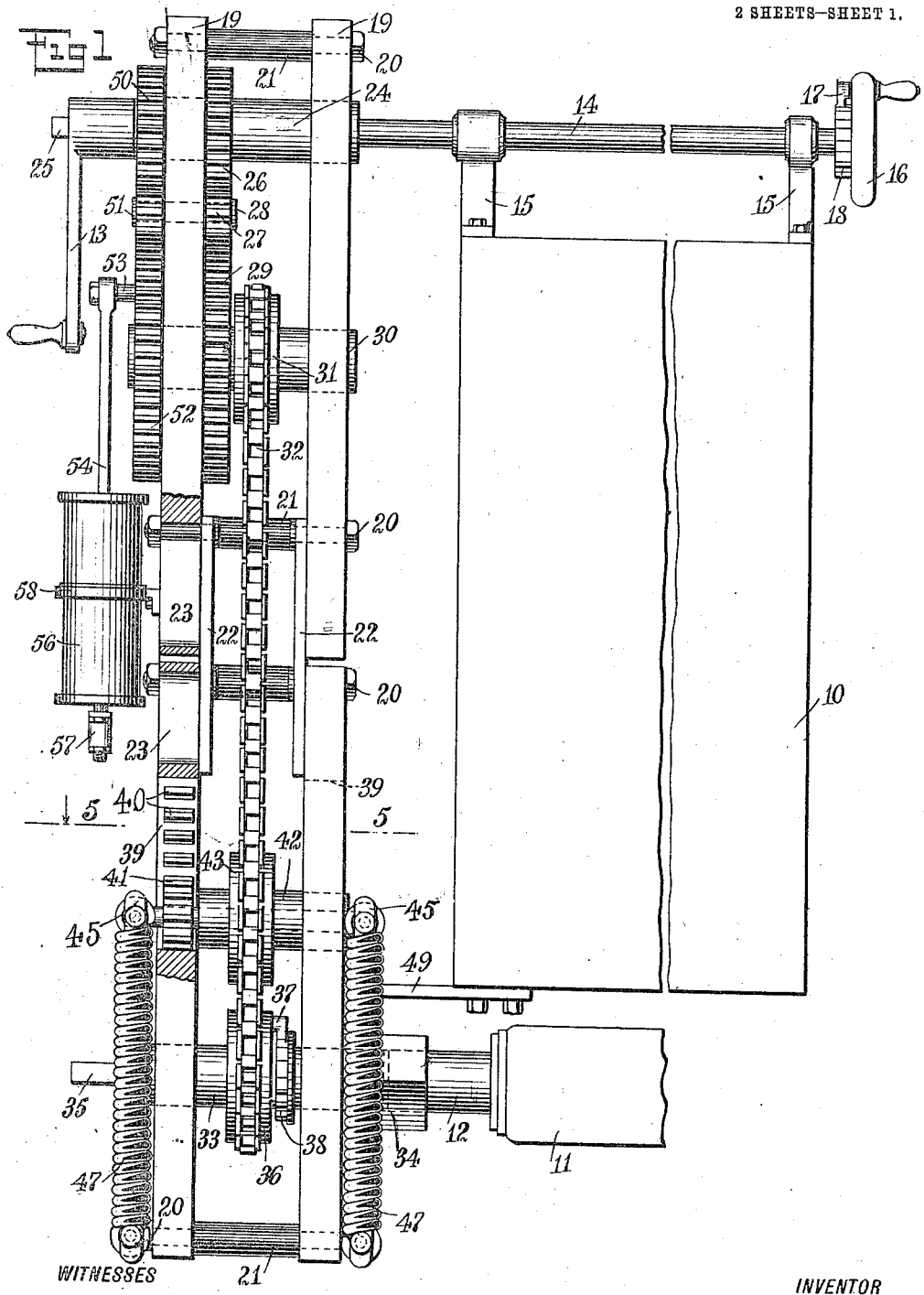
WITNESSES
C. J. Hachenberg
Edwin Burch
INVENTOR
Harry H. Moseley
BY Munn & Co
ATTORNEYS

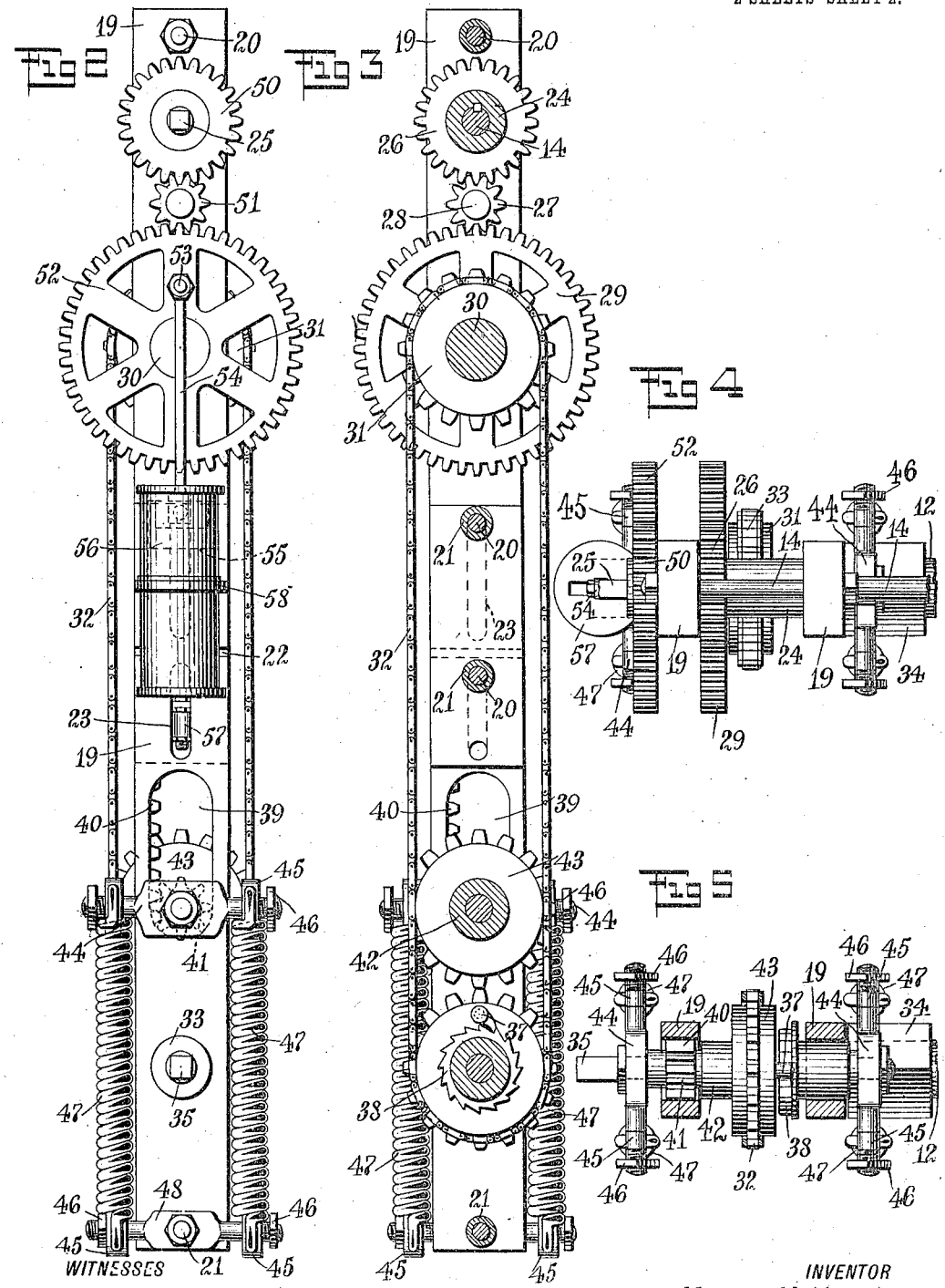

UNITED STATES PATENT OFFICE.

HARRY HINCKLEY MOSELEY, OF ATLANTIC, MASSACHUSETTS.

AUTOMOBILE-STARTER.

1,092,739.  Specification of Letters Patent.  Patented Apr. 7, 1914.

Application filed June 14, 1913. Serial No. 773,665.

*To all whom it may concern:*

Be it known that I, HARRY H. MOSELEY, a citizen of the United States, and a resident of Atlantic, in the county of Norfolk and State of Massachusetts, have invented a new and Improved Automobile-Starter, of which the following is a full, clear, and exact description.

This invention has special reference to starting devices for automobiles and like motor vehicles of the usual internal combustion type, and the primary object thereof is to provide an efficient and positively operable device capable of operation by the chauffeur from the steering seat to impart initial cranking motion to the crank shaft of the motor for starting the latter, thus obviating the necessity of the chauffeur alighting from the car.

A further object of the invention is to provide an automobile starter which consists of a frame supported upon the hood of the car forwardly thereof and which carries a plurality of geared parts connected to a series of springs and designed to be operated by the chaffeur to expand the springs, such geared parts being operatively connected to the crank shaft of the motor and adapted upon the release of the tension tending to expand the springs to permit the latter to retract and impart initial cranking motion to the shaft, the cranking operation by the springs being accomplished through the medium of a direct drive so as to exert its power instantaneously, thereby exerting considerably more power in any definite period of time than is required in expanding the springs for the same period of time for the purpose specified.

A still further object of the invention is to provide an air compressor associated with the geared parts specified to provide compressed air for inflating the tires or the like, as well as an additional supporting means for the usual turning crank, whereby the latter will be in convenient position for use in the usual manner in case of an emergency.

With the above and other objects in view, the invention resides more particularly in the peculiar combinations and arrangements of parts which will be illustrated as a preferred embodiment in the accompanying drawings and described in the specification.

Reference is to be had to the accompanying drawings forming a part of this specification, in which similar characters of reference indicate corresponding parts in all the views, and in which—

Figure 1 is a side elevation partly in section of my improved automobile starter applied to the hood of an automobile, the hood and the operating shaft supported over the same, being shown broken away; Fig. 2 is a front elevation of the improved starter; Fig. 3 is a vertical sectional view of the same taken rearwardly of the forward supporting bar of the frame; Fig. 4 is a plan view of the device; and Fig. 5 is a horizontal sectional view taken on the line 5—5 of Fig. 1, looking in the direction indicated by the arrow.

As illustrated in the preferred embodiment of the invention, the numeral 10 indicates the hood of an automobile motor, which latter is provided with a bearing extension 11 from the crank case, from which the cranking shaft 12 projects forwardly, said cranking shaft being provided with the usual squared portion for the application of an ordinary turning crank 13. The present invention provides means for normally obviating the use of the crank 13 in starting the crank shaft of the motor, and for this purpose an operating shaft 14 is rotatably journaled in bearing brackets 15 mounted upon the hood near the ends of the latter, said operating shaft at its rear end having a crank wheel 16 rotatably mounted thereon. This crank wheel carries a pawl 17 designed to engage the peripheral ratchet teeth of a ratchet wheel 18 which is fixed to the shaft 14 in contact with the crank wheel. The ratchet wheel and pawl are designed to coöperate to permit turning of the shaft 14 when the crank wheel is turned toward the right and to permit rotation of the shaft independently of the crank wheel in the same direction upon release of the turning power upon the crank wheel.

Vertically mounted in front of the hood 10 is a frame comprising spaced vertical frame members or bars 19 connected and held in spaced parallel relation by bolts 20 and interposed sleeves 21 located at the upper and lower ends of the respective bars which are disposed endwise in pairs. The intermediate fastening means are connected to plates 22 which overlie the adjacent ends of the bars and which serve to rigidify the same when the bolts are adjusted in the spaced slots 23 provided transversely through the bars, to increase or decrease the length of the frame.

Journaled horizontally through the bars near the upper ends of the latter and in alinement with the shaft 14 is a sleeve 24 which is fixed to the shaft 14, the shaft 14 projecting forwardly of the frame and having a squared portion 25 upon which the crank 13 is mounted to be used in case of emergency. A pinion 26 is fixed to the sleeve 24 between the frame members and meshes with a pinion 27 journaled on one extremity of a stub shaft 28 carried by the upper forward frame bar, said pinion 27 in turn meshing with a gear 29 fixed to a shaft 30 also horizontally journaled through the frame and having fixed thereto a sprocket wheel 31 around which an endless drive chain 32 is engaged.

Horizontally journaled through the frame bars, in alinement with the cranking shaft 12, is a shaft 33 which is designed to rotate with the shaft 12 through the instrumentality of a coupling 34, and said shaft 33 is provided with a squared forward end 35 for the application of the crank 13 should it be necessary to rotate the crank shaft for starting the engine in this manner. Journaled on the shaft 33 is a sprocket wheel 36 around which the chain 32 also engages, and said sprocket wheel carries a pawl 37 designed to engage the peripheral teeth of a ratchet wheel 38 which is fixed to said shaft 33, thus permitting rotation of the sprocket wheel independently of the shaft 33 in one direction and causing the shaft 33 to rotate therewith in the opposite direction. The frame bars 19 are further provided with a pair of horizontally alined vertical slots 39 above the sprocket wheel 36, the left hand walls of said slots having rack teeth 40 engageable by pinions 41 mounted on the ends of the shaft 42.

Fixed to the shaft 42 is a sprocket wheel 43 engaged at diametrically opposite sides by the endless drive chain 32 but normally held downwardly displaced in the slots 39. For this purpose cross heads 44 are loosely mounted and retained on the extremities of the shaft 42 and provided with reduced extremities having bearing blocks 45 loosely mounted thereon and retained in position by means of nuts 46. Anchored to the blocks 45 at their upper extremities are retractile springs 47, four of said springs being provided and having their lower extremities similarly connected to the reduced extremities of cross heads 48 carried by the lower bolt 20. Thus it will appear that when it is desired to impart rotation to the crank shaft for starting the motor, the chauffeur grasps the crank wheel 16 and by partially turning the same causes the rotation of the shaft 14 through the coöperating pawl and ratchet wheel 17 and 18. This in turn imparts rotation to the gear 29 through the intermeshed pinions 26 and 27, thus turning the chain 32 but failing to rotate the shaft 33 due to the loose mounting of the sprocket wheel 36 thereon and the free passage of the pawl 37 over the teeth of the ratchet wheel 38. This rotation of the chain will, however, rotate the sprocket wheel 43, and by reason of the engagement of the pinions 41 with the rack teeth 40, the sprocket wheel 43 will be elevated together with the shaft 42, thereby causing the expansion of the springs 47. The parts are so geared that only a few rotations of the shaft 14 is required to elevate the shaft 42 in the slots 39, and upon releasing the pulling power from the crank wheel 16 the springs 47 will retract and positively rotate the parts specified, including the opposite rotation of the pinions 41 during the lowering of the shaft 42, and owing to the engagement of the pawl 37 with the right-angular walls of the ratchet wheel 38, rotation will be imparted to the shaft 33, and this rotation will in turn be transmitted to the crank shaft 12 through the instrumentality of the coupling 34, thus starting the engine. The adjustment of the frame lengthwise will serve to adapt the device for hoods of various heights, and the frame if desired may be supported additionally by means of a bracket plate 49 on the bottom of the frame.

In order to provide means for inflating the tires or for furnishing air under pressure for other desired purposes, a pinion 50 is fixed to the sleeve 24 forwardly of the frame and is disposed in mesh with the pinion 51 fixed to the forward end of the stub shaft 28, said pinion in turn meshing with a gear 52 fixed to the forward end of the shaft 30. The gear 52 carries a crank pin 53 to which the crank rod 54 of a piston 55 operating in a cylinder 56 of a pump or air compressor is connected. Thus, when rotation is imparted to the gear 52, reciprocation is imparted to the piston, and the compressed air may be led off through a valve 57 by means of a suitable conduit to the tires. The cylinder 56 is supported by a circular bearing bracket 58 carried by the uppermost of the front frame bars and designed to be adjusted therewith so that the throw of the crank pin will not be varied when the frame is adjusted in length.

Having thus described my invention, what I claim as new and desire to secure by Letters Patent is:—

1. An automobile starter, comprising the combination with the crank shaft of a motor and a hood; of a frame supported in front of the hood, a shaft journaled on the hood and extending rearwardly thereof, a crank wheel mounted on the rear end of the shaft for rotating the same in one direction, a pair of shafts journaled in the frame, one of said shafts being geared to the first-named shaft, a sprocket wheel fixed to said geared shaft, a sprocket wheel loose upon the other shaft, a chain engaged around said sprocket wheels, a pawl carried by said loose sprocket wheel, a ratchet wheel fixed to said shaft carrying the loose sprocket wheel and engaged by said pawl, whereby rotation may be imparted to the last-named shaft in one direction, coupling means for the crank shaft and the last-named shaft, and means operable upon the release of said shaft on the hood to impart opposite rotation to the shaft carrying the loose sprocket wheel for rotating the crank shaft.

2. An automobile starter, comprising the combination with the crank shaft of a motor and a hood; of a shaft journaled on the hood and extending rearwardly thereof, a crank wheel mounted on the rear end of the shaft for rotating the same in one direction, a pair of shafts journaled in the frame, one of said shafts being geared to the first-named shaft, a sprocket wheel fixed to said geared shaft, a sprocket wheel loose upon the other shaft, a chain engaged around said sprocket wheels, a pawl carried by said loose sprocket wheel, a ratchet wheel fixed to said shaft carrying the loose sprocket wheel and engaged by said pawl, whereby rotation may be imparted to the last-named shaft in one direction, coupling means for the crank shaft and the last-named shaft, said frame comprising spaced bars having alined slots and having rack teeth on certain side walls thereof, a shaft having pinions disposed to engage said rack teeth, a sprocket wheel fixed to said last named shaft and engaged at opposite sides by the chain to elevate the latter shaft upon rotation of the chain in one direction, springs anchored at their lower ends to the frame and at their upper ends loosely to the opposite ends of the shaft last-named, whereby when the crank wheel is released after the springs have been distended said springs will impart opposite rotation to said chain for transmitting rotation to the crank shaft through engagement of the pawl last-named with said ratchet wheel.

3. An automobile starter, comprising the combination with the crank shaft of a motor and a hood; of a frame supported in front of the hood, a shaft journaled on the hood and extending rearwardly thereof, a crank wheel mounted on the rear end of the shaft for rotating the same in one direction, a pair of shafts journaled in the frame, one of said shafts being geared to the first-named shaft, a sprocket wheel fixed to said geared shaft, a sprocket wheel loose on the other shaft, a chain engaged around said sprocket wheels, a pawl carried by said loose sprocket wheel, a ratchet wheel fixed to said shaft carrying the loose sprocket wheel and engaged by said pawl, whereby rotation may be imparted to the last-named shaft in one direction, coupling means for the crank shaft and the last-named shaft, means operable upon the release of the hood shaft after rotation of certain of said parts in one direction to impart opposite rotation to the shaft coupled to the crank shaft for rotating the crank shaft, said first and third-named shafts having squared extensions designed to support a turning crank, and means for adjusting the length of the frame.

4. An automobile starter, comprising the combination with the crank shaft of a motor and a hood; of a frame supported in front of the hood, a shaft journaled on the hood and extending rearwardly thereof, a crank wheel mounted on the rear end of the shaft for rotating the same in one direction, a pair of shafts journaled in the frame, one of said shafts being geared to the first-named shaft, a sprocket wheel fixed to said geared shaft, a sprocket wheel loose on the other shaft, a chain engaged around said sprocket wheels, a pawl carried by said loose sprocket wheel, a ratchet wheel fixed to said shaft carrying the loose sprocket wheel and engaged by said pawl, whereby rotation may be imparted to the last-named shaft in one direction, coupling means for the crank shaft and the last-named shaft and means operable upon the release of strain on the crank wheel tending to rotate the hood shaft, to impart rotation to the crank shaft.

5. The combination with a crank shaft of a motor, an operating shaft and means for imparting rotation thereto in one direction; of a shiftable shaft, drive connections between the operating shaft, crank shaft and shiftable shaft, designed to permit the crank shaft to remain stationary when said third-named shaft is shifted, and springs anchored each at one end and connected to the shiftable shaft to move the same in the opposite direction for imparting rotation to the crank shaft upon release of the operating shaft.

6. The combination with a crank shaft of a motor, an operating shaft and means for imparting rotation thereto in one direction; of a vertically movable shaft, drive connections between the operating shaft, crank shaft and movable shaft, whereby the movable shaft may be shifted in one direction independent of rotation of the crank shaft, and spring means connected to the movable shaft to shift the latter in the opposite direction for rotating the crank shaft, upon release of the movable shaft at the end of its upward movements.

In testimony whereof I have signed my name to this specification in the presence of two subscribing witnesses.

HARRY HINCKLEY MOSELEY.

Witnesses:
 CLARENCE BURGIN,
 KATHERINE F. ROCHE.